United States Patent
Hiramatsu et al.

[11] 3,863,496
[45] Feb. 4, 1975

[54] CURVED SURFACE SCANNING APPARATUS

[75] Inventors: Tsunehisa Hiramatsu, Miki; Hiroshi Nosaka, Kakogawa, both of Japan

[73] Assignee: Mitsubishi Jukogyo Kabushiki Kaisha, Tokyo, Japan

[22] Filed: Sept. 7, 1973

[21] Appl. No.: 395,077

[30] Foreign Application Priority Data
Sept. 30, 1972  Japan.......................... 47-113802[U]
Sept. 30, 1972  Japan.......................... 47-113803[U]

[52] U.S. Cl. ............................................... 73/67.8 S
[51] Int. Cl. .............................................. G01n 29/04
[58] Field of Search ................................... 73/67.8 S

[56] References Cited
UNITED STATES PATENTS
3,470,868  10/1969  Krause et al.................. 73/67.8 S X
3,529,466  9/1970  Pryor et al........................ 73/67.8 S
3,593,120  7/1971  Mandula et al............... 73/67.8 S X Primary Examiner—James J. Gill
Attorney, Agent, or Firm—Cushman, Darby & Cushman

[57] ABSTRACT

An apparatus for scanning a joint portion formed by connecting a circular pipe to a drum portion of a cylindrical vessel from the interior of said vessel for the purpose of non-destructive flaw hunting and the like, is described which performs the scanning operation by displacing a scanning head such as, for example, a flaw hunting head along a guide slot having a curvature corresponding to the curved surface to be scanned while rotating the same around the axis of said circular pipe. Provision of a pilot control device in the aforementioned apparatus for automatically maintaining the distance constant between said scanning head and said curved surface to be scanned is also described.

5 Claims, 10 Drawing Figures

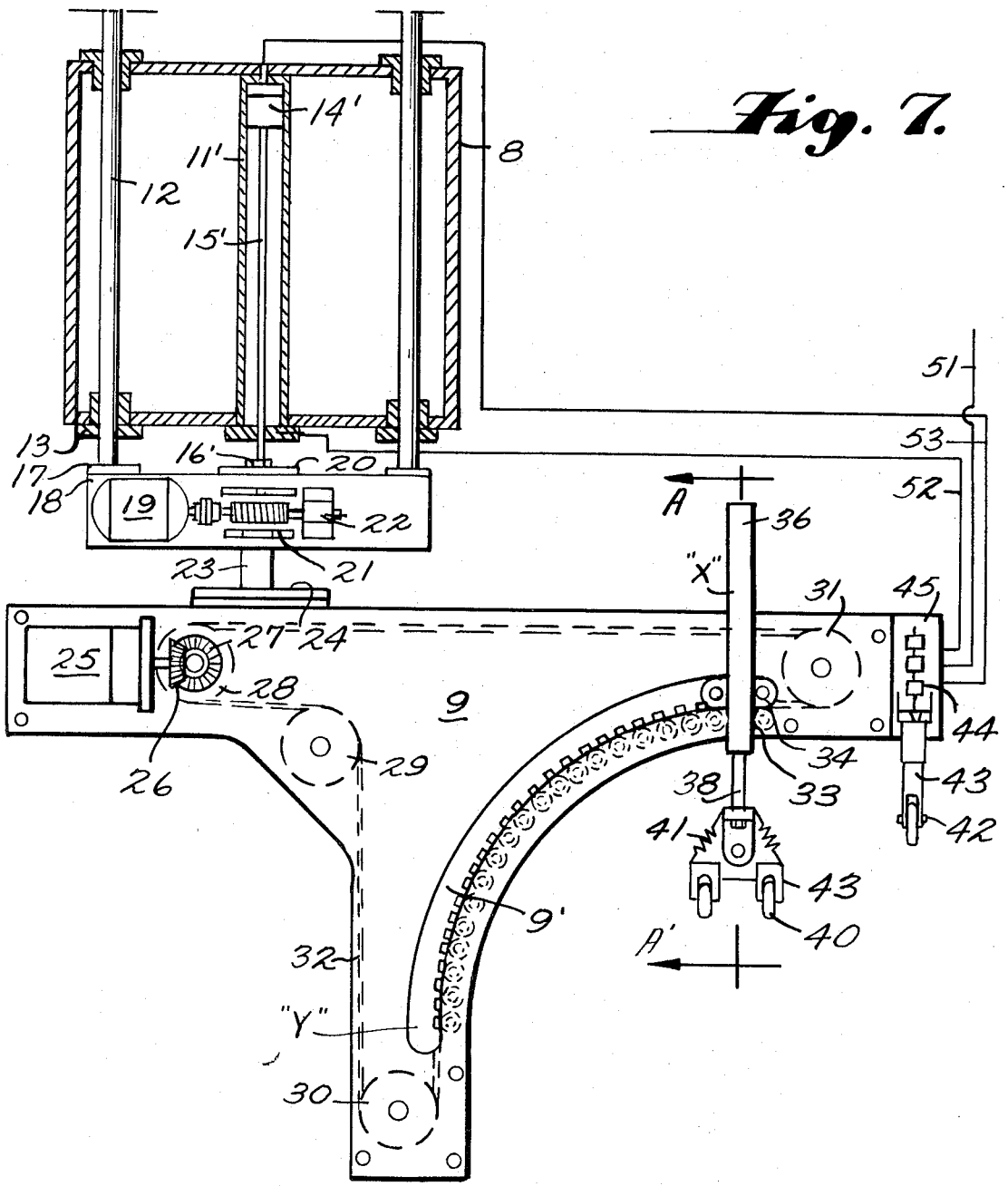
Fig. 7.
Fig. 3B.
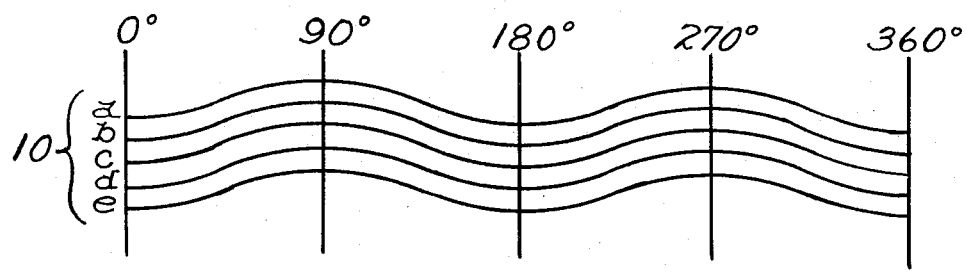

3,863,496

CURVED SURFACE SCANNING APPARATUS

BACKGROUND OF THE INVENTION

The present invention relates to a scanning apparatus for a saddle-shaped curved surface for use, for example, in a flaw hunting apparatus for scanning and hunting flaws over a wide range of inner curved surface portion of a so-called "saddle" joint portion formed upon connecting by welding a circular pipe to a drum portion of a cylindrical vessel.

For instance, in the case of a pressurized vessel in a nuclear reactor, a routine check for flaws over welded portions as well as portions where concentrated stress is expected, is required. However, a flaw hunting apparatus which can effectively scan over the saddle-shaped curved surface on the inside of the above-referred joint portion, has not been developed.

Therefore, it is an object of the present invention to provide a scanning apparatus which can make a scanning head such as, for example, a flaw hunting head scan over a curved surface to be scanned always without forced motion and thereby can conveniently scan the curved surface portion on the inside of the above-referred saddle-shaped joint portion. Also it is another object of the present invention to provide a scanning apparatus adapted to be displaced conveniently over the entire curved surface while maintaining the distance between the scanning head and the curved surface to be scanned substantially constant.

SUMMARY OF THE INVENTION

In order to achieve the above-mentioned objects, the present invention contemplates to provide a curved surface scanning apparatus in which a scanning head rotating around the axis of said circular pipe is displaced in accordance with the configuration of the curved surface portion, that is, the saddle shape so as to be maintained at a constant distance from said curved surface, whereby the saddle-shaped curved surface portion may be scanned over a wide range while maintaining the scanning head always in a predetermined relationship to said curved surface.

The apparatus according to the present invention also employs a pilot control device which can maintain the scanning head always at a substantially constant distance from the curved surface to be scanned.

DESCRIPTION OF THE DRAWINGS

In the drawings;

FIG. 3B is a representation of another example of the scanning lines similar to FIG. 3A, FIG. 7 is a plan view similar to FIG. 4 but showing another example of the apparatus according to the present invention.

Figure 1:
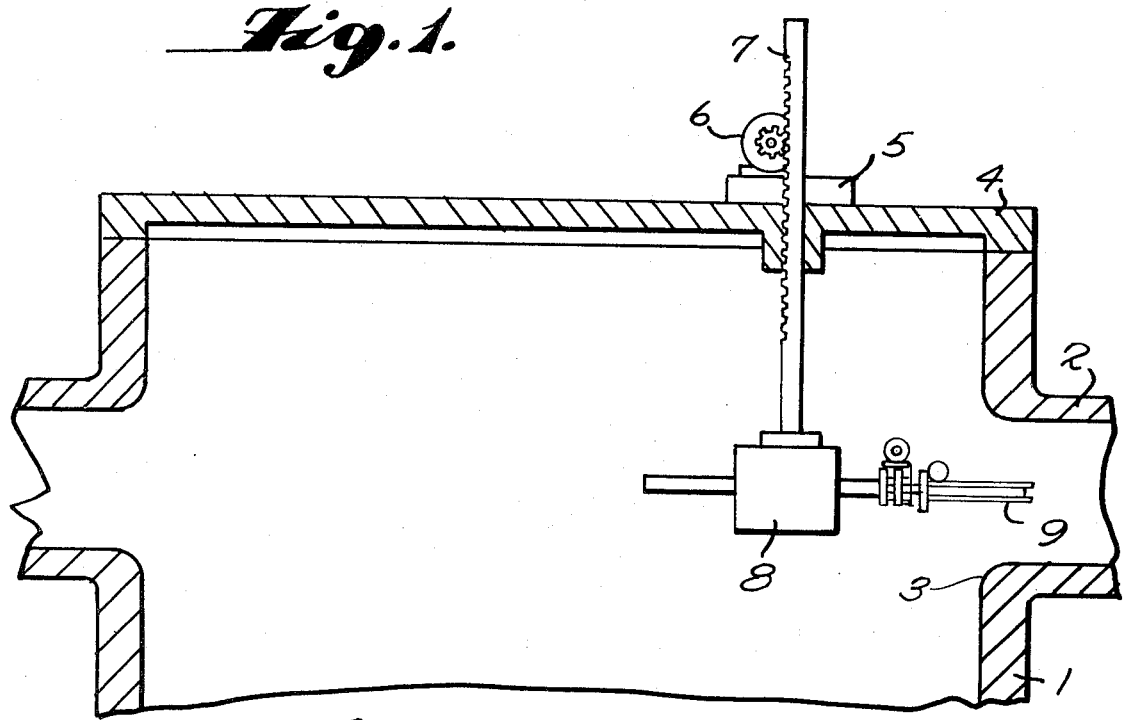
FIG. 1 is a cross-section side view showing one example of an apparatus according to the present invention as applied to flaw hunting of a joint portion between a drum portion of a cylindrical vessel and a circular pipe welded thereto.

DETAILED DESCRIPTION OF THE EMBODIMENTS:

Now the present invention will be described in more detail in conjunction to its preferred embodiments shown in the drawings. In the following examples, the invention is described as applied to a flaw hunting apparatus, although it is not limited thereto.

Figure 2A:
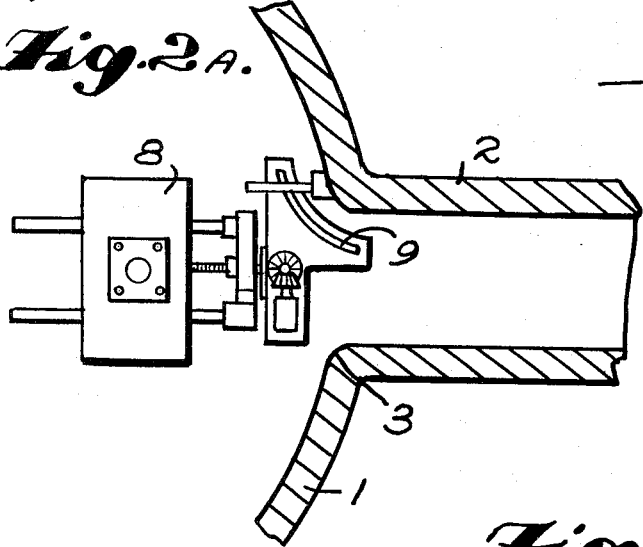
FIG. 2A is a top view of the apparatus shown in FIG. 1.
Figure 2B:
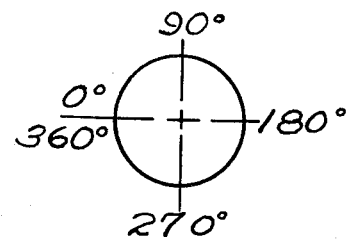
FIG. 2B is a front view of the connected circular pipe.

FIGS. 1 and 2A show the state of a curved surface flaw hunting apparatus as applied to a location to be checked, in which reference numeral 1 designates a drum portion of a cylindrical pressurized vessel, numeral 2 designates a circular pipe connected thereto, numeral 3 designates a curved surface portion to be subjected to flaw hunting which serves as a curved surface to be scanned to which the principal object of the present invention is directed, numeral 9 designates a main body of a flaw hunting device which serves as a main body of a scanning apparatus (hereinafter referred to simply as "main body"), numeral 8 designates a box for holding the main body 9, numeral 4 designates a flange for mounting the flaw hunting device which serves as a scanning apparatus, and numerals 5 to 7 jointly designate means for vertically moving the box 8, numeral 5 representing a mounting base, numeral 6 representing a driving unit including a pinion, and numeral 7 representing a rack column for supporting the box 8. In this connection, the curved surface portion 3 has a saddle shape which is formed by welding the circular pipe 2 to the cylindrical vessel 1. It will be readily appreciated that the curved surface portion 3 has the maximum convex at the positions of 0° and 180° as viewed in FIGS. 2B which shows a front view of the circular pipe 2, and it coincides with the radius of the cylinder 1 at the positions of 90° and 270°.

Figure 4:
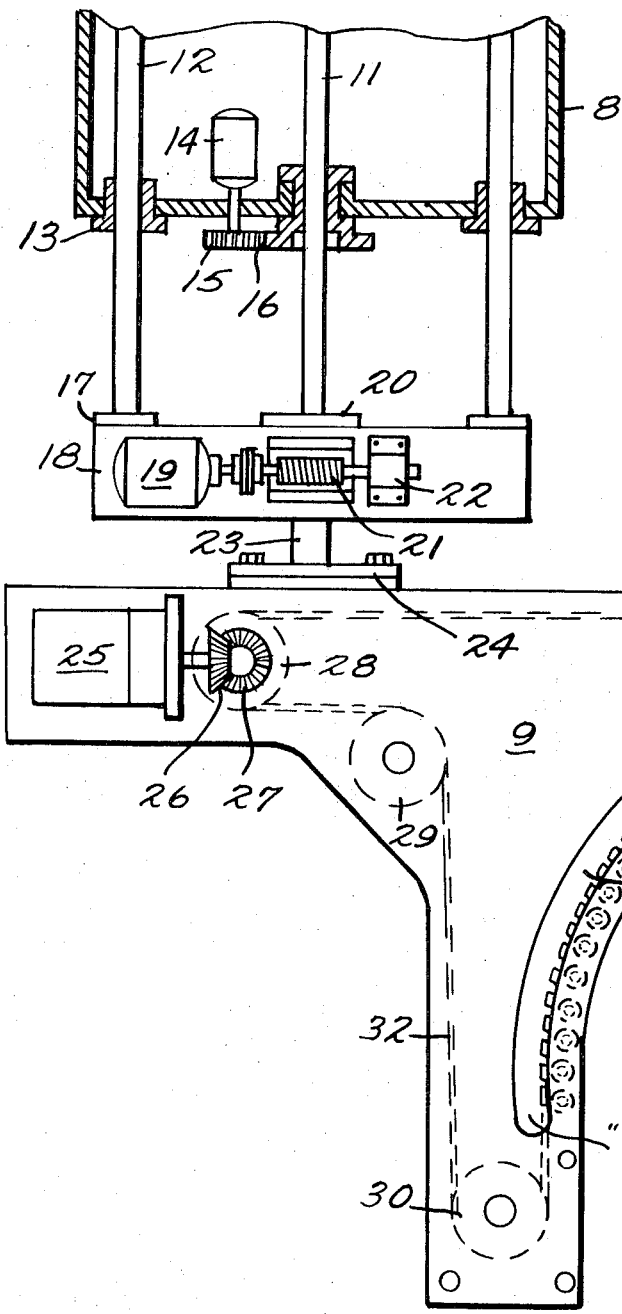
FIG. 4 is an enlarged plan view of an apparatus according to the present invention as employed in the arrangement shown in FIGS. 1 and 2.
Figure 6:
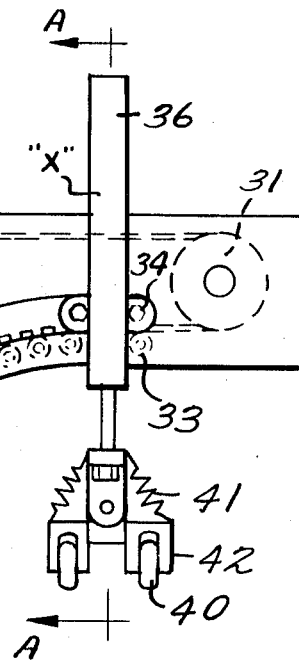
FIG. 6 is a side view of the apparatus shown in FIG. 4.
Figure 6:
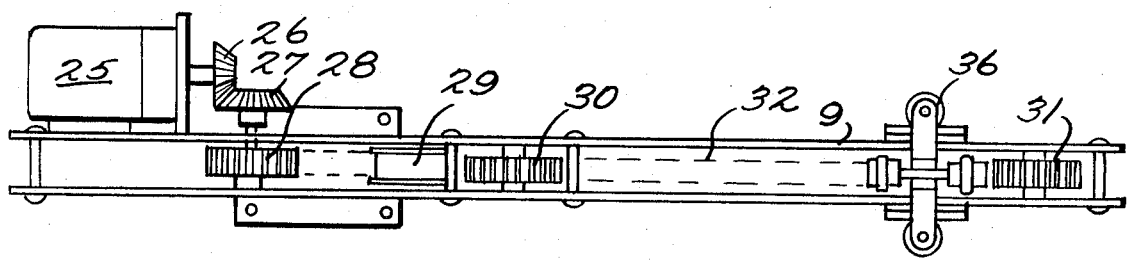
Figure 5:
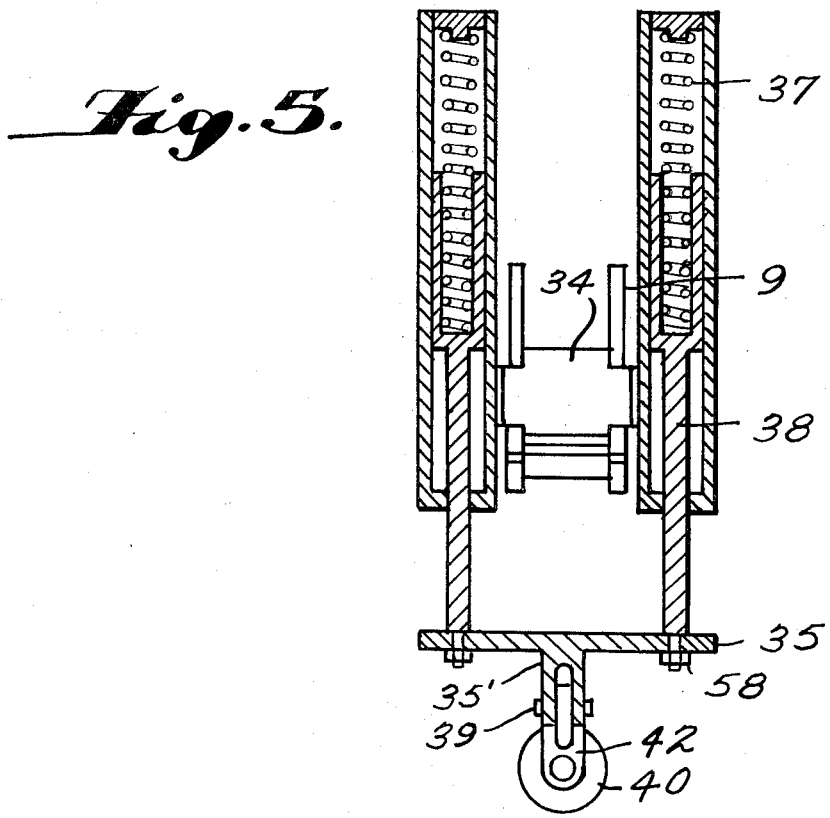
FIG. 5 is a cross-section view taken along line A—A' in FIG. 4.

Now at first the structure of the flaw hunting device will be described with reference to FIGS. 4 and 6. The box 8 is provided with a pair of guide rods 12, bearings 13, feed screw 11, motor 14, gear 15 and geared nut 16 as shown in these figures. A base plate 18 is supported by flanges 20 and 17 of said feed screw 11 and said guide rods 12, respectively, and on said base plate 18 are mounted a motor 19, worm 21, bearing 22, worm wheel (not shown) and rotary shaft 23, one end of said rotary shaft 23 being secured to a rear surface of the main body 9 of the flaw hunting device. On the main body 9 are mounted a motor 25, bevel gears 26 and 27, pulleys 28, 29, 30 and 31, and belt 32 extending around these pulleys. The main body 9 is provided with a curved slot 9' having a curvature approximated to the curvature of the corresponding part of the curved surface portion to be investigated as shown in FIGS. 2A and 4, and along this curved slot 9' a large number of rollers 33 are provided to form a curved guide for said belt 32. A slider 34 is adapted to be fed in and along the curved slot 9' as it is driven by the belt 32, and to said slider 34 is fixedly secured a profiling unit as shown in FIGS. 4 and 5. The main body 9 comprises two, upper and lower, plates which are coupled with each other by means of bolts. In FIGS. 4 and 5, the slider 34 is interposed between the upper and lower plates of the main body 9 and it carries a pair of spring cylinders 36 on the upper and lower sides, respectively, of the main body. Within the spring cylinder 36 are accommodated a shaft 38 and a spring 37, and the extremities of the respective shafts of the pair of cylinders are fixedly secured to a coupling arm 35 by means of nuts 58. At the center of the coupling arm 35 is provided a fork-shaped protrusion 35' to which a fork member 42 is connected via a pin 39, a pair of wheels 40 being mounted on the respective sides of the fork member 42, and springs 41 are disposed between the shoulders of the fork member 42 on its respective sides and the corresponding sides of the coupling arm 35. The flaw hunting head or probe serving as a scanning head is fixedly secured to a part of the fork member 42.

Operation of the flaw hunting device as described above will be explained hereinafter. As shown in FIGS. 1 and 2A, the driving unit 6 is mounted on a part of the flange 4 disposed at the top of the vessel 1, and then the vertical position of the box 8 is adjusted by means of the rack column 7 so that the main body 9 may be positioned on the center axis of the circular pipe 2. It is to be noted that the relative position of the box 8 with respect to the circular pipe 2 in the circumferential direction of the vessel 1 has been preliminarily adjusted upon mounting the flange 4 on the cylindrical vessel 1. After the mounting and positioning of the box 8 has been completed in the above-described manner, when the motor 14 is energized, the nut 16 is caused to rotate by the rotation of the gear 15, so that the feed screw 11 advances as supported by a pair of guide rods 12 and thereby causes the base plate 18 and thus the main body 9 to advance. This advance of the main body 9 is continued until the main body 9 approaches to an appropriate position relative to the curved surface to be investigated, when said advance is ceased and the main body is fixed at that position so as not to be displaced thereafter. The curved surface portion 3 is of saddle shape which has the maximum amount of convexness at the angular position of 0° and 180° as viewed in FIG. 2B and which coincides with the radius of the vessel 1 at the angular position of 90° and 270°. Therefore, in case that the main body 9 is fed forwardly under the state shown in FIG. 4, the amount of advance of the main body 9 such that the spring 37 of the variable length arm (FIG. 5) has been compressed to the maximum extent corresponds to the aforementioned appropriate position for advance.

In response to rotation of the motor 19 mounted on the base plate 18, the worm 21 having its one end supported by the bearing 22 is driven to rotate the rotary shaft 23. As a result, a pair of wheels 40 are revolved while being pressed onto the curved surface to be investigated owing to the resilient force of the spring 37. The stroke of the shaft 38 and the spring 37 corresponds to the amounts of convexness and concaveness of the saddle shape, and this motion becomes large when the radius of the circular pipe 2 is large and it takes the maximum value at point X shown in FIG. 4.

When it is desired to shift the scanning line, the motor 25 on the main body 29 is energized to rotate the pulley 28 which is coaxially coupled to the bevel gear 27, so that the slider 34 is displaced along the curved slot 9' by means of the belt 32 which is extended around the pulleys 28, 29, 30 and 31. As a result, the spring cylinder 36 is displaced from the position X towards the position Y, and consequently, with respect to every scanning line the flaw hunting probe is positioned substantially at an equal distance from the curved surface to be investigated and directed substantially at a right angle to said curved surface. Therefore, the automatic profiling mechanism according to the present invention can fully achieve its function in that the wheels 40 can faithfully follow the curved surface to enable the flaw hunting probe to scan over a wide range.

Figure 3A:
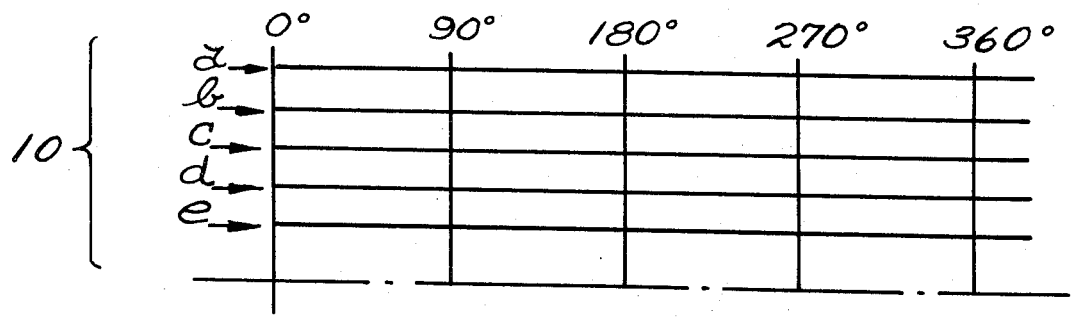
FIG. 3A is a representation of one example of the scanning lines obtained by making use of the apparatus according to the present invention.

As a result, the scanning lines are obtained as substantially rectilinear lines separated from each other substantially at equal intervals as illustrated at (a) through (e) in FIG. 3A (the angular position is taken along the abscissa and the length of the saddle-shaped curved surface is taken along the ordinates), and thereby it has been proved that the entire range of the saddle-shaped curved surface portion can be scanned.

As described, according to the present invention, owing to the fact that the slider 34 is displaced along the curved slot 9' provided in the main body which slot has a curvature substantially equal to that of the curved surface to be scanned, the spring 41 of the automatic profiling means is not subjected to forced action and also the spring 37 of the automatic profiling means which makes its stroke according to the amounts of convexness and concaveness of the saddle shape, so that profiling of a saddle-shaped curved surface which has been heretofore considered difficult is made possible by means of a relatively simple mechanism, and thus scanning of every curved surface including a saddle-shaped surface has become possible.

Therefore, the present invention can be effectively applied not only to a curved surface flaw hunting device but also to apparatus for checking a surface area or a volume while profiling a saddle-shaped curved surface, an automatic welding apparatus for a curved surface portion, and a cleaning apparatus for a curved surface portion.

Figure 8:
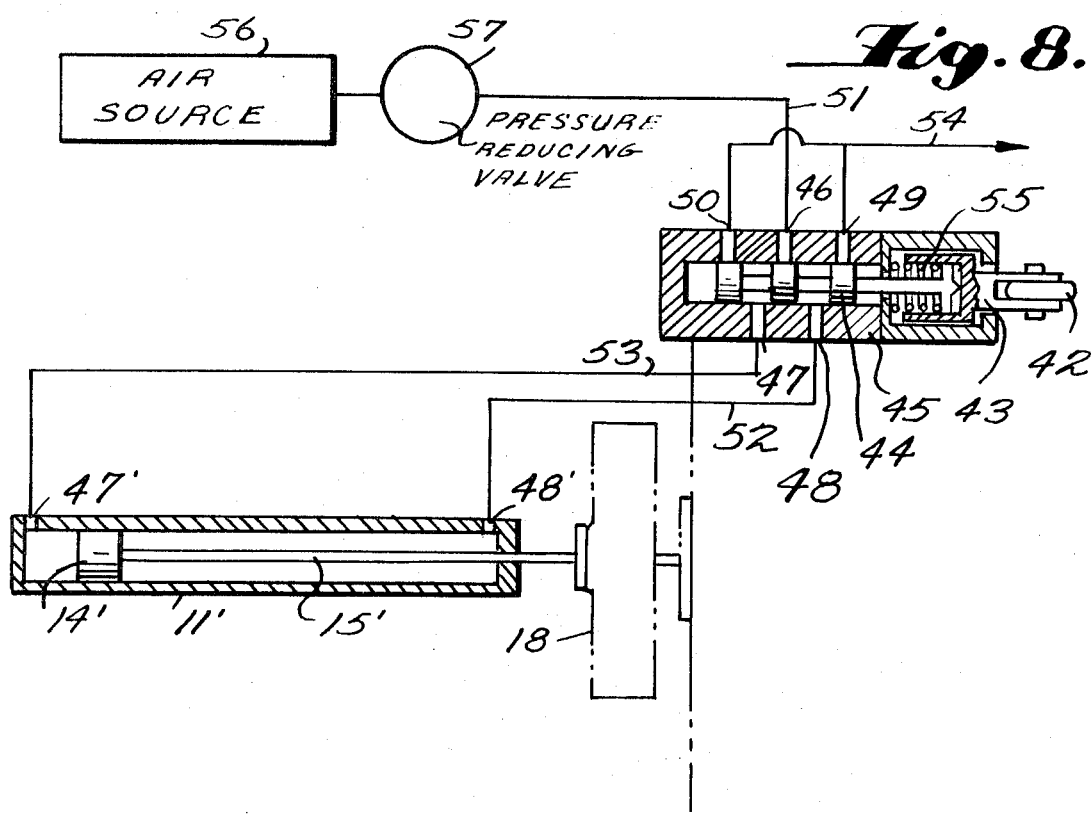
FIG. 8 is a schematic view showing a control system for use in a pilot control device shown in FIG. 7.

Nextly, a description will be made of an alternative embodiment of the present invention illustrated in FIGS. 7 and 8.

In FIG. 7, component parts corresponding to those of the apparatus shown in FIG. 4 are given like reference numerals and description thereof will be omitted.

Whereas in the embodiment shown in FIG. 4 the base plate 18 and thus the main body 9 are displaced in the axial direction by the operative engagement of the feed screw 11 with the geared nut 16 which is in turn rotated by the motor 14, the alternative embodiment shown in FIG. 7 comprises a cylinder 11', piston 14', rod 15' and nut 16' as will be apparent from the figure. The base plate 18 is supported by the flanges 20 and 17 of the piston rod 15' and the guide rods 12, respectively. In addition, the apparatus shown in FIG. 7 is provided with a pilot valve main body 45, pilot valve 44, fork 43 and wheel 42 at the right end (as viewed in FIG. 7) of the main body 9, and these component parts constitute a pilot control device which is in turn hydraulically coupled to said cylinder 11'. More particularly, with reference to FIG. 8, a pressured air line is connected from an air source 56 that is illustrated by way of example through a pressure reducing valve 57 and a feed pipe 51 to a feed port 46 of the pilot valve main body 45, while loading ports 47 and 48 are connected to air ports 47' and 48', respectively, of the cylinder 11' through pipings 53 and 52, respectively. The wheel 42 is pressed in the forward direction via the fork 43 by the action of the spring 55 so as to be integrally coupled to the pilot valve 44. With regard to the remaining portions, the apparatus is similar to that shown in FIG. 4.

Now the operation of the apparatus shown in FIGS. 7 and 8 will be described. After the positioning of the box 8 at a desired location with respect to the circular pipe 2 has been accomplished in the same manner as that explained with reference to FIG. 4, if the piston 14' in FIG. 7 is actuated with a hydraulic pressure, then the base plate 18 is advanced as supported by a pair of guide rods 12 in accordance with a displacement of the rod 15'. This advance is continued until the wheel 42 of said pilot profiling means takes a state such that it comes near to the position where it makes contact with the curved surface to be investigated, when the advance is stopped and thereafter a pilot control as explained hereinafter follows. In FIG. 8, when there exists no object contacting with the wheel 42, the pilot valve 44 is pushed rightwardly by the action of the spring 55. Then the hydraulic pressure (for example, pneumatic pressure) fed through the reducing valve 57 is applied to the feed port 46 via the feed pipe 51, and since an axial displacement exists between the pilot valve 44 and the pilot valve body 45 which is indirectly coupled to the rod 15', said hydraulic pressure will pressurize the cylinder loading port 47' via the piping 53 which is in turn connected to the loading port 47 to push the piston 14' and the rod 15' rightwardly. On the other hand, the fluid on the opposite side of the piston 14' within the cylinder 11' is discharged from an exhaust pipe 54 via the loading port 48', piping 52, loading port 48 and exhaust port 49. Then an advance movement of the base plate 18 and the main body 9 continues until the wheel 42 reaches the curved surface portion 3, when the pilot valve main body 45 is pushed rightwardly against the resilient force of the spring 55, and consequently, the pilot valve 44 is displaced leftwardly to close the feed port as well as exhaust port resulting in interruption of the motion of the main body 9. When the main body 9 is revolved, the wheel 42 moves forth and back by the stroke corresponding to the amount of convexness and concaveness of the saddle shaped at the curved surface portion 3, and so the pilot control is repeatedly achieved in the above-described manner to maintain the revolving main body 9 always at a constant distance from the curved surface to be investigated. In other words, owing to the above-described automatic pilot control, the pair of wheels 40 on the automatic profiling mechanism can follow the curved surface while they are pressed with a constant resilient force exerted by the spring 37. When the slider 34 is stepwisely displaced from the point X to the point Y by energizing the motor 25 and the main body 9 is moved in accordance with the configuration of the saddle-shaped curved surface portion 3 by making use of the pilot control device, the resulting scanning lines 10 take the form shown at (a) to (e) in FIG. 3B, from which it is obvious that the entire region of the saddle-shaped curved furface portion 3 can be scanned.

As described above, according to the second embodiment of the present invention, by employing the pilot control device the main body of the scanning apparatus can be maintained always at a substantially constant distance from the curved surface portion to be investigated, and thereby scanning by faithfully profiling the curved surface becomes possible.

While the present invention has been described in detail above in conjunction to the accompanying drawings, it is a matter of course that the description was made not in a limiting sense but various changes could be made to the illustrated embodiments within the scope of the present invention.

What is claimed is:

1. Apparatus for scanning the saddle shaped intersection of the bores of a first tubular member with a second tubular member from inside the base of the first tubular members, comprising:

a main body;

support means for disposing the main body in the first tubular member for rotation therein about the longitudinal axis of the bore of the second tubular member;

means defining an arcuate track on the main body, concave toward the saddle generally about an axis which remains perpendicular to the longitudinal axis of the bore of the second tubular member as the main body is rotated as aforesaid;

a slider mounted on the main body for movement along the track and means for moving the slider along the track;

longitudinally extensible arm means mounted on the slider and provided with means for maintaining the arm directed toward the saddle regardless of the position of the slider along the track, the arm means having a first portion secured to the slider, a second portion disposed adjacent the saddle and provided with a contact member for engaging at least one of the tubular members in the vicinity of the saddle shaped intersection to standardize the proximity of the second portion with respect to the saddle shaped intersection, and means for extending the second portion with respect to the first portion, toward the saddle shaped intersection to ensure engagement of the contact member as aforesaid;

a scanning unit mounted on the second portion and and oriented to scan the saddle shaped intersection, whereby the main body may be rotated to cause the scanning unit to scan the saddle shaped intersection at a given radius, and the slider may be moved along the arcuate track to change the radius of scanning.

2. The apparatus of claim 1, wherein the contact member comprises at least one wheel means journalling the wheel for rotation against at least one of the tubular members.

3. The apparatus of claim 2 wherein the track is constituted by a slot in the main body.

4. The apparatus of claim 1, wherein the extending means comprises compression coil spring means, and means confining the spring means in opposed engagement between the first and second portions of the extensible arm means.

5. The apparatus of claim 1, wherein the support means comprises a first part and a second part and extending means including a pressurized fluid operated piston and cylinder arrangement in opposed engagement between the first and second parts of the support means; a source of pressurized fluid communicated to the piston and cylinder arrangement for extending the piston from the cylinder; a pilot valve in operating communication with the pressurized fluid source for regulating supply of pressurized fluid to the piston and cylinder arrangement; the pilot valve including an actuator means and means for biasing the actuator into surface following contact with at least one of said tubular members in the vicinity of the saddle shaped intersection, so that the pilot valve may cause the main body to be axially advanced until the actuator signals that, in effect, the desired proximity of the main body second portion to the saddle shaped intersection has been reached.

* * * * *